United States Patent [19]

Binsack et al.

[11] Patent Number: 4,535,124
[45] Date of Patent: Aug. 13, 1985

[54] THERMOPLASTIC POLYESTER MOULDING COMPOSITIONS WHICH HAVE GOOD IMPACT STRENGTH

[75] Inventors: Rudolf Binsack, Krefeld; Dieter Rempel, Leverkusen; Christian Lindner; Leo Morbitzer, both of Cologne, all of Fed. Rep. of Germany

[73] Assignee: Bayer Aktiengesellschaft, Leverkusen, Fed. Rep. of Germany

[21] Appl. No.: 624,576

[22] Filed: Jun. 26, 1984

[30] Foreign Application Priority Data

Jul. 6, 1983 [DE] Fed. Rep. of Germany ....... 3324398
Oct. 27, 1983 [DE] Fed. Rep. of Germany ....... 3339001

[51] Int. Cl.$^3$ .............................................. C08L 51/04
[52] U.S. Cl. .......................................... 525/67; 525/64
[58] Field of Search ..................................... 525/64, 67

[56] References Cited

U.S. PATENT DOCUMENTS

| Re. 31,165 | 3/1983 | Serini | 525/67 |
| 3,852,394 | 12/1974 | Kubota | 525/67 |
| 3,864,428 | 2/1975 | Nakamura | 525/67 |
| 4,367,310 | 1/1983 | Henton | 525/67 |

*Primary Examiner*—Paul R. Michl
*Attorney, Agent, or Firm*—Connolly and Hutz

[57] ABSTRACT

The present invention relates to thermoplastic moulding compositions, which have improved impact strength at low temperature, comprising thermoplastic polyesters, in particular polyalkylene terephthalates, and grafted, partially or highly cross-linked diene rubbers and/or acrylate rubbers having a bimodal rubber particle size distribution.

9 Claims, No Drawings

THERMOPLASTIC POLYESTER MOULDING COMPOSITIONS WHICH HAVE GOOD IMPACT STRENGTH

The present invention relates to thermoplastic moulding compositions, which have an improved impact strength at low temperature, comprising thermoplastic polyesters, particularly polyalkylene terephthalate, and grafted, at least partially cross-linked diene rubbers and/or acrylate rubbers which have a bimodal distribution of rubber particle diameter.

Thermoplastic polyesters, in particular polyethylene terephthalate, polybutylene terephthalate and several co-polyesters have become commercially more and more important on account of their excellent technical properties such as rigidity, hardness, scuff resistance, stability under dynamic and thermal stresses as well as the rapid processibility thereof. One disadvantage of these polyesters is their unsatisfactory impact strength.

There have been a number of proposals for improving the impact strength of thermoplastic polyesters by the admixture of other polymers. (Co)-polystyrenes were suggested (DE-OS No. 1,694,173, DE-OS No. 1,961,226, DE-OS No. 2,035,390, DE-OS No. 2,248,242), polyolefins (EP-A No. 13 941), as were grafted acrylate rubbers (DE-PS No. 2,444,584, DE-OS No. 2,726,256), and grafted diene rubbers (DE-PS No. 2,348,377). Furthermore, grafted acrylate rubbers and grafted diene rubbers were proposed which have a very specific graft structure, or are produced according to specific processes (EP-A No. 22 216, EP-A No. 50,265, EP-A No. 50 262, EP-A No. 64 207, DE-OS No. 3,114,772).

The moulding compositions which were proposed generally have an improved strength. It has been found, however, that they are not always completely satisfactory for important fields of application such as in the automobile industry where great deformation forces can be active in collisions, for example on the bodywork, the bumpers and spoilers, the steering wheel and the steering column. Specific requirements are set for this, even at temperatures as low as $-20°$ C., sometimes $-30°$ C.

The present invention thus provides thermoplastic moulding compositions comprising (A) from 65 to 97, preferably from 70 to 95 and in particular from 75 to 90 % by weight (based on A+B) of thermoplastic polyester and (B) from 3 to 35, preferably from 5 to 30 and in particular from 10 to 25 % by weight (based on A+B) of graft product of at least one vinyl monomer selected from styrene, acrylonitrile and methylmethacrylate on particle-shaped, at least partially cross-linked diene rubbers and/or alkylacrylate rubbers which have an average rubber particle diameter of from 0.05 to 1 $\mu$m, a rubber content of the graft products of from 60 to 85, preferably from 65 to 80, and particularly from 70 to 75 % by weight (of B), characterised in that the graft product (B) is produced on the basis of a mixture of (a) from 20 to 80, preferably from 30 to 70 and in particular from 35 to 60 % by weight (based on a+b) of a rubber latex which has a particle diameter $d_{50}$ of from 0.05 to 0.19, preferably from 0.08 to 0.15 $\mu$m and (b) from 80 to 20, preferably from 70 to 30 and in particular from 65 to 40 % by weight (based on a+b) of a rubber latex which has a particle diameter $d_{50}$ of from 0.2 to 1, preferably from 0.25 to 0.8 and in particular from 0.3 to 0.6 $\mu$m, with the limitation that (1) $d_{50}(b)$ is larger than $d_{50}(a)$ by a factor of from 1.5 to 8, preferably from 2.7 to 5, in particular from 3 to 4.5, (2) the quotient $Q=(d_{90}-d_{10})/d_{50}$ of the particular rubbers is at most 2, preferably at most 1.8, in particular at most 0.8, and (3) the difference $d_{10}(b)-d_{90}(a)$ is from 0.01 to $-0.10$, preferably from 0 to $-0.08$ and in particular from 0 to $-0.05$.

The above percentages by weight are referred to the solids content.

To produce the graft product B it is possible either to mix a rubber latex corresponding to (a) and a rubber latex corresponding to (b) in the above-mentioned quantity ratio and to graft polymerise the vinyl monomers onto this mixture, or separately to graft polymerise the vinyl monomers onto a rubber latex corresponding to (a) and onto a rubber latex corresponding to (b) and to mix both graft products (either as latices with subsequent common precipitation or as solids which are already present). The second method is preferred.

These moulding compositions are more suitable for the above-mentioned fields of use than the known compositions and yet they do not suffer from any significant disadvantages.

It is essential to use at least partially cross-linked diene rubbers and/or acrylate rubbers which have a rubber particle size of from 0.05 to 1 $\mu$m and a "bimodal" particle diameter distribution.

This means that by combining particular coarsely-divided rubbers with particular finely divided rubbers in the form of graft polymers B moulding compositions according to the invention having considerably improved properties are obtained; for this purpose, the particle size distribution of the rubbers which are used for the preparation of component B has to be bimodal and should exhibit two pronounced maxima. In order to obtain the effect associated with these specific particle size distribution, it is, however, necessary to start with rubber having a particle size distribution conforming to specific parameters:

These include a critical width of the distribution curve (expressed by the quotient Q), a critical distance between the maxima of the distribution curve (expressed by the difference $d_{50}(b)-d_{50}(a)$) and a critical overlapping of the distribution curves (expressed by the difference $d_{10}(b)-d_{90}(a)$).

The effect according to the present invention is all the more surpising as finely-divided rubber only moderately increases the impact strength of thermoplastic polyesters and coarsely-divided rubber causes a continuous decrease in the strength of the moulding compositions as the temperature decreases.

The graft products B include graft polymers which have rubber-elastic properties and are obtained by grafting vinyl monomers selected from styrene, acrylonitrile and methylmethacrylate onto particle-shaped, at least partially cross-linked diene rubbers and/or alkyl-acrylate rubbers.

Examples of preferred graft monomers are methyl methacrylate and mixtures consisting of styrene and methyl methacrylate or styrene and acrylonitrile.

Diene rubbers are particle-shaped, cross-linked homo- and/or copolymers consisting of conjugated $C_4$-$C_6$-dienes. The diene which is most preferred is butadiene-1,3. The diene copolymers may contain, in addition to the diene radicals, up to 30 % by weight, based on the copolymer, of radicals of other ethylenically unsaturated monomers, such as styrene, acrylonitrile, esters of acrylic or methacrylic acid with monohydric alcohols having from 1 to 4 carbon atoms, such as methyl acrylate, ethyl acrylate, methyl methacrylate and ethyl methacrylate.

The production of the diene-rubber-graft base and the graft polymers is known and is described, for example, in "Methoden der Organischen Chemie" (Houben Weyl), Vol. 14/1, Georg Thieme Verlag, Stuttgart 1961, P. 393–406, and in Ullmanns Encyclopädie der technischen Chemie, 4th edition, Vol. 19, Verlag Chemie 1981, P. 279 to 284.

Alkyl-acrylate rubbers are particle shaped, cross-linked alkyl acrylate polymers which are obtained by the polymerisation of esters consisting of acrylic acid and monohydric alcohols having from 1 to 8 carbon atoms. The polymers may also be copolymers of acrylic acid esters having up to 40 % by weight of other vinyl monomers such as styrene, acrylonitrile, methyl methacrylate, vinyl ester and vinyl ether.

The alkyl acrylate rubbers are cross-linked by, for example, polymerising therein polyfunctional, copolymerisable olefinically unsaturated comonomers, which have a cross-linking effect. Monomers which have more than one polymerisable double bond may be copolymerised for cross-linking. Preferred examples of crosslinking monomers are the esters of unsaturated mono-carboxylic acids having from 3 to 8 carbon atoms and unsaturated monohydric alcohols having from 3 to 12 carbon atoms or saturated polyols having from 2 to 4 OH-groups and from 2 to 20 carbon atoms, such as ethylene glycol dimethacrylate or allyl methacrylate; polyunsaturated heterocyclic compounds such as trivinyl- and triallylcyanurate and-isocyanurate; tris-acryloyl-s-triazines; in particular triallylcyanurate; polyfunctional vinyl compounds such as di- and trivinyl benzenes; but also triallyl phosphate and diallyl phthalate.

Preferred cross-linking monomers are allyl methacrylate, ethylene glycol dimethacrylate, diallylphthalate and heterocyclic compounds which have at least three ethylenically unsaturated groups.

Cross-linking monomers which are particularly preferred are the cyclic monomers triallylcyanurate, triallylisocyanurate, trivinyl cyanurate, triacryloylhexahydro-s-triazine and triallyl benzenes.

The quantity of the cross-linking monomers is preferably from 0.02 to 5, in particular from 0.05 to 2 % by weight, based on the rubber-graft base.

It is advantageous not to use more than 1 %, by weight, based on the rubber-graft base, in the case of cyclic, cross-linked monomers which have at least three ethylenically unsaturated groups.

Alkyl acrylate rubbers may also be products which have more than one sheath and contain a cross-linked diene rubber of one or more conjugated dienes, such as polybutadiene, or a copolymer of a conjugated diene with an ethylenically unsaturated monomer, such as styrene and/or acrylonitrile, as a core and polymerised acrylate monomer as a shell thereon.

The proportion of the polydiene-core in rubbers of this type which have more than one sheath may be from 0.1 to 80, preferably from 10 to 50 % by weight. Sheath(es) and core may be independently partially cross-linked or highly cross-linked.

The diene rubbers and the alkyl acrylate-rubbers are present as particles which have an average diameter $d_{50}$ ranging from 0.05 to 1 $\mu$m and are at least partially cross-linked. They usually have a gel content of $\geq 50$ % by weight, preferably $\geq 80$ % and in particular $\geq 90$ %.

The average particle diameter may be determined using ultra-centrifuge measurements (W. Scholtan, H. Lange, Kolloid. Z. and Z. Polymere 250 (1972), 782–796) or by using electron microscopy and subsequently counting the particles (G. Kämpf, H. Schuster, Angew. Makromolekulare Chemie 14, (1970), 111–129).

If the particle size distributions are determined by means of electron microscopy and subsequent counting of the particles, number averages (and not weight averages) are obtained. Number averages thus determined do then, however, have to be converted into weight averages to make them comparable with the values $d_{10}$, $d_{50}$, $d_{90}$ given herein. This conversion can be carried out, for instance, by the method of W. Scholtan and H. Lange and provides the same or nearly the same values for both methods. Furthermore, reference is made to DIN (German Industrial Standard) 53 206 in which conversions of particle size distributions are defined.

The average particle sizes given in this application are in all cases the weight averages of the particle size as determined by means of an analytical ultracentrifuge according to the method of W. Scholtan and H. Lange, Kolloid-Z. and Z. Polymere 250 (1972), pages 782–796. The ultracentrifuge determination provides the integral mass distribution of the particle diameter of the specimen. From this it is possible to conclude which percentage by weight of the particles have a diameter equal to or smaller than a particular size. The average particle diameter which is also termed the $d_{50}$ value of the integral mass distribution is defined as that particle diameter at which 50 % by weight of the particles have a diameter equal to or smaller than the diameter equalling the $d_{50}$ value. In order to characterise the width of the size distribution of the rubber particles, the $d_{10}$ and $d_{90}$ values taken from the integral mass distribution are used in addition to the $d_{50}$ value (average particle diameter). The $d_{10}$ and $d_{90}$ values of the integral mass distribution are defined in the same way as the $d_{50}$ value, but with the difference that they refer to 10 and 90 % by weight of the particles. The quotient $$\frac{d_{90} - d_{10}}{d_{50}} = Q$$

is a criterion for the width of the distribution of the particle size.

The difference $d_{10}(b) - d_{90}(a)$ is a criterion for the overlapping of the curves: If the difference is positive, there is no or only a slight overlapping of the curves; if the difference is negative, a curve overlapping exists, the extent of which is given by the size of the negativ value.

As already stated, it is also possible to determine the number average distribution of the rubber particles and then to convert these into weight averages. The microscopic counting method according to Kümpf et al. is the more exact, the greater the number of particles counted; usually, at least $10^4$ particles should be measured which then, after statistical evaluation, provide a particle size number average distribution curve. It is, for instance, possible in this procedure to select the particle size classes to be of such a size that 90 % of the particles are distributed over not less, but not more than 20 classes.

It must, however, be added that the rubber particles in the moulding compositions are in a grafted state; it could, therefore be assumed that the grafting has changed the rubber particle size compared with the rubber particles present in the rubber latices (for the preparation of B). It has, however, been found that the grafting as well as the quantity of the graft shell, according to the characteristics described herein, hardly influence the rubber particle size so that distribution curves determined from moulding compositions can be compared with distribution curves determined from latices.

The gel content of the diene-rubbers is determined at 25° C. in toluene, and the gel content of the alkyl acrylate rubbers is determined at 25° C. in dimethylformamide (M. Hoffmann, H. Krömer, R. Kuhn, Polymeranalytik I and II, Georg Thieme Verlag, Stuttgart 1977).

Grafted alkyl acrylate-rubbers which are preferred are alkyl acrylate-rubbers which (a) are cross-linked with cyclic trifunctional comonomers, such as triallylcyanurate and triallylisocyanurate (described in DE-OS No. 30 39 114);

(b) contain a polybutadiene-core (described in DE-OS No. 30 39 115);

(c) are produced in the absence of a suspending agent (described in DE-OS No. 31 17 052).

Rubbers which have the particle diameter according to the present invention may be obtained by emulsion polymerising suitable monomers. In the emulsion polymerisation process which is known for this purpose, the latex particle diameters may be set by selecting appropriate procedural conditions such as the type and concentration of the emulsifier, particle agglomerization, electrolytes, temperature and monomer polymer concentration.

During the production of the graft products B by graft copolymerisation, which is conventionally carried out in the presence of radical starters, such as water-soluble initiators, emulsifiers or complexing agents/graft activators and regulators, free polymers or copolymers of the graft monomers which form the graft sheath are generally formed to a certain extent in addition to the actual graft polymer. The quantity of this ungrafted polymer may be characterised by the degree of grafting or the grafting yield. This is dependent, among other things, on the polymerisation conditions, the composition of the rubber graft base, the size of the particles to be grafted and the quantity of grafted rubber graft base.

The graft product B within the context of the present invention is, for this reason, the product which results from the polymerisation of vinyl monomers in the presence of the rubber latices, thus to be more exact generally a mixture consisting of graft copolymer and free copolymer of the graft monomers.

The moulding compositions according to the present invention have optimum properties if the quantity of free (co)polymer of the graft monomers does not exceed certain limits. The upper limit is generally 15 % by weight, preferably 10 % by weight and most particularly 7 % by weight, based on the moulding composition consisting of A+B. The Staudinger index $[\eta]$ of these free (co)-polymers is usually $\leq 0.6$ dl/g, measured in dimethyl-formamide at 25° C., and preferably $\leq 0.4$ dl/g.

To obtain specific technical properties it may also be advantageous separately to produce the polymers of the graft monomers and to mix the moulding compositions in during the production thereof.

It is also possible, however, to proceed by ensuring that polymer of the graft monomers which is separately produced is present during graft co-polymerisation. It is also possible to separate polymer of the graft monomers, which is optionally in excess, from the graft products B. The method which is selected depends on the polymerisation process which is chosen, the type of rubber graft base in each case, the type and quantity of the graft monomers and the desired technical properties of the moulding compositions.

One skilled in the art can carry out and control the graft polymerisation of the graft monomers on the rubber particles in such a way that the requisite graft product compositions according to the present invention are formed and that simultaneously the optionally requisite graft monomer polymer content is produced.

Specific polymers of this type, consisting of graft polymers in admixture with suitable graft monomer polymers, may then be directly used to produce the moulding compositions. In such cases the graft polymers are, of course, from a chemical point of view substantially identical to the graft monomer polymers. The present invention does not rule out graft monomer polymers being of a completely different nature to the graft monomers which are used for grafting. By way of example, a polymethyl methacrylate may be used as graft monomer polymer and simultaneously a styrene-acrylonitrile-grafted rubber may be used as graft product B. Combinations of this type may optionally be associated with particular advantages in terms of use.

The "bimodal" graft products B may be produced according to various processes. They may be produced by grafting a dispersion of finely-divided rubber particles (corresponding to a) with monomers, then mixing this graft polymer emulsion with a graft polymer emulsion which has been separately produced on coarsely-divided rubber particles, and subsequently working up this mixture.

The rubber particle diameter (latices) may also be mixed and the graft monomers, in particular in aqueous emulsion, may be graft polymerised onto this mixture using radical-forming systems and then worked up in known manner.

Finely-divided graft products and coarsely divided graft products may also be produced separately and mixed and this mixture may be subsequently worked up.

According to the preferred process, the mixtures consisting of rubber particle dispersions and having the bimodal particle distribution according to the present invention are grafted with graft monomers, in particular in aqueous emulsion using radical-forming systems, and then worked up in known manner.

Finely-divided graft products and coarsely-divided graft products may also be separately produced and mixed, in quantities corresponding to the composition a/b according to the present invention, with the thermoplastic polyesters to produce the moulding compositions according to the present invention.

In the processes where the graft product is separately grafted and worked up together on the one hand and on the other hand where finely-divided and coarsely-divided graft product are separately produced, it is also possible to use graft products which have a different structure of the finely-divided and the coarsely-divided constituents.

These processes are thus preferred.

Thermoplastic polyesters A within the context of the present invention are condensation products consisting of aromatic dicarboxylic acids (or the derivatives thereof) and aliphatic, cycloaliphatic, araliphatic or aromatic diols and mixtures of these reaction products.

Thermoplastic polyesters A consisting of aromatic dicarboxylic acids and aromatic diols are preferably condensation products consisting of terephthalic acid and isophthalic acid (or the derivatives thereof) and diphenols corresponding to the general formula:

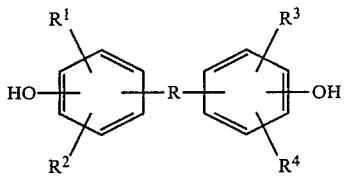

wherein

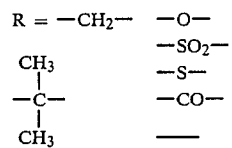

$R^1$, $R^2$, $R^3$ and $R^4$ represent an alkyl group having from 1 to 4 carbon atoms or H.

The diphenyl which is most preferred is 2,2-bis-(4-hydroxyphenyl)-propane.

Thermoplastic polyesters A consisting of aromatic dicarboxylic acids or the reactive derivatives thereof (such as dimethyl esters or anhydrides) and aliphatic, cycloaliphatic or araliphatic diols and mixtures of these reaction products are preferred polyalkylene terephthalates.

Preferred polyalkylene terephthalates may be produced according to known methods from terephthalic acid (or the reactive derivatives thereof) and aliphatic or cycloaliphatic diols having from 2 to 10 carbon atoms (Kunststoff-Handbuch, Vol. VIII, P. 695 et seq, Carl Hanser Verlag, Munich 1973).

Preferred polyalkylene terephthalates contain at least 80, preferably at least 90 mol %, based on the dicarboxylic acid constituent, of terephthalic acid radicals and at least 80, preferably at least 90 mol %, based on the diol constituent, of ethylene glycol- and/or butanediol-1,4-radicals. They may contain up to 20 mol % of radicals of other aromatic dicarboxylic acids having from 8 to 14 carbon atoms or aliphatic dicarboxylic acids having from 4 to 12 carbon atoms, such as radicals of phthalic acid, isophthalic acid, naphthalene-2, 6-dicarboxylic acid, 4,4'-diphenyldicarboxylic acid, succinic, adipic sebacic and azelaic acid, and cyclohexane diacetic acid, in addition to terephthalic acid radicals.

In addition to ethylene- or butanediol-1,4- glycol radicals they may contain up to 20 mol % of other aliphatic diols having from 3 to 12 carbon atoms or cycloaliphatic diols having from 6 to 21 carbon atoms, such as the radicals of propanediol-1,3, 2-ethylpropanediol-1,3, neopentyl glycol, pentanediol-1,5, hexanediol-1,6, cyclohexanedimethanol-1,4, 3-methylpentanediol-2,4,2-methylpentanediol-2,4, 2,2,4-trimethylpentanediol-1,3 and -1,6, 2-ethylhexanediol-1,3, 2,2-diethylpropanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-OS No. 24 07 674, 24 07 776, 27 15 932).

The polyakylene terephthalates may be branched by the insertion of relatively small quantities of 3- or 4- hydric alcohols or 3- or 4-basic carboxylic acids, such as are described in DE-OS No. 19 00 270 and U.S. Pat. No. 3,692,744. Examples of preferred branching agents are trimesic acid, trimellitic acid, trimethylol ethane and -propane and pentaerythritol.

It is advisable not to use more than 1 mol % of the branching agent, based on the acid constituent.

Polyalkylene terephthalates which are produced solely from terephthalic acid and/or the reactive derivatives thereof (such as the dialkyl esters thereof) and ethylene glycol or butanediol-1,4, mixtures of these polyalkylene terephthalates and copolyesters which are produced from at least two of the above-mentioned acid consituents and/or from at least two of the above-mentioned alcohol constituents are preferred; copolyesters which are particularly preferred are poly(ethylene glycol/butandiol-1,4)-terephthalates.

Polyalkylene terephthalates which are most particularly suitable have an intrinsic viscosity of from 0.4 to 1.5 dl/g, preferably from 0.5 to 1.4 dl/g and in particular from 0.6 to 1.3 dl/g, in each case measured in phenol/o-dichlorobenzene (1:1 parts, by weight) at 25° C. in an Ubbelohde-viscosimeter.

Thermoplastic polyesters A also include polyesters which contain long-chain diols as a diol constituent. Preferred long-chain diols are dihydroxy polyethylene oxide corresponding to the total formula $HO(CH_2CH_2O)_nH$ and dihydroxy tetrahydrofuran corresponding to the formula $HO(CH_2CH_2CH_2CH_2O)_mH$.

The average molecular weight (number average) of the long-chain diols generally ranges from 500 to 5,000, preferably from 1,000 to 3,000 (and n is thus about 10 to 100, preferably about 25 to 60; m is about 7 to 70, preferably from 14 to 40).

Preferred polyesters which have long-chain diols contain terephthalic acid and/or isophthalic acid as an acid constituent and dihydroxy tetrahydrofuran and butane diol as a diol constituent, the content of cocondensed long-chain diol units generally being below 60 %, by weight, based on the total content of co-condensed diol units.

Depending on the desired properties, the thermoplastic polyesters may be used individually or in admixture.

Preferred mixtures contain polyethylene terephthalate and polybutylene terephthalate having from 1 to 99, preferably from 10 to 60 and in particular from 20 to 50 % by weight of polyethylene terephthalate, and from 99 to 1, preferably from 90 to 40 and in particular from 80 to 50 % by weight of polybutylene terephthalate.

For specific properties up to 80 % by weight, preferably up to 60 % by weight and more particularly up to 40 % by weight, based on A, of the thermoplastic polyesters may be aromatic polycarbonates.

The term aromatic polycarbonates is to be understood as meaning within the context of the present invention homopolycarbonates, copolycarbonates and mixtures of these polycarbonates, which are based, for example, on at least one of the following diphenols:

hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones,
α,α'-bis-(hydroxyphenyl)-diisopropylbenzenes
and the nucleus-alkylated and nucleus-halogenated derivatives thereof. The above-mentioned and other suitable diphenyls are described, for example, in U.S. Pat. Nos. 3,028,365, 3,275,601, 3,148,172, 3,062,781, 2,991,273, 3,271,367, 2,999,835, 2,970,131 and 2,999,846, in DE-OS Nos. 1,570,703, 2,063,050, 2,063,052, 2,211,956, and 2,211,957, in FR-PS No. 1,561,518 and in H. Schnell's "Chemistry and Physics of Polycarbonates", Interscience Publishers, New York, 1964.

Examples of preferred diphenols are:
4,4'-dihydroxydiphenyl,
2,4-bis-(4-hydroxyphenyl)-2-methylbutane,
α,α'-(bis-(4-hydroxyphenyl)-p-diisopropylbenzene,
2,2-bis-(3-methyl-4-hydroxyphenyl)-propane and
2,2-bis-(3-chloro-4-hydroxyphenyl)-propane.

Examples of particularly preferred diphenols are:
2,2-bis-(4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane and
2,2-bis-(3,5-dimethyl-4-hydroxyphenyl)-propane.

The aromatic polycarbonates may be branched by the insertion of small quantities, preferably from 0.05 to 2.0 mol % (based on the diphenols which are used) of tri- or more than trifunctional compounds, such as compounds which have three or more than three phenolic hydroxy groups.

The aromatic polycarbonates should generally have an average molecular weight $\overline{M}_w$ of from 10,000 to more than 200,000, preferably from 20,000 to 80,000, which is determined by measuring the relative viscosity in dichloromethane at 25° C. and in a concentration of 0.5 %, by weight.

Small quantities of low molecular weight polycarbonates which have, for example, an average polycondensation degree of from 2 to 20, may be admixed with the high molecular weight polycarbonates having and $\overline{M}_w$ of from 10,000 to 200,000.

Chain terminators such as phenol, phenol halides or alkyl phenols are used in calculated quantities to fix the molecular weight $\overline{M}_w$ of the polycarbonates.

The moulding compositions according to the present invention may contain conventional additives such as lubricants and mould release agents, nucleating agents, stabilizers, fillers and strengtheners, flameproofing agents and coloured pigments and/or dyes.

The filled or reinforced moulding compositions may contain up to 60 % by weight, based on the reinforced moulding composition, of fillers and/or reinforcing substances. Reinforcing substances which are preferred are glass fibres. Fillers which are preferred and which may also have a reinforcing effect are glass balls, mica, silicates, feldspar, quartz, talcum, titanium dioxide and wollastonite.

The moulding compositions which are provided with flameproofing agents contain flameproofing agents in a concentration of generally less than 30 % by weight, based on the flameproofed moulding compositions.

All known flame-protective agents may be used, such as polyhalodiphenyl, polyhalodiphenyl ether, polyhalophthalic acid and the derivatives thereof and polyhalo-oligo- and -polycarbonates, the corresponding bromine compounds being particularly effective. Moreover, they generally contain a synergist such as antimony trioxide.

The moulding compositions may be produced in conventional mixing aggregates such as rollers, kneaders mono- and multishaft extruders.

Even if in most cases all the resin constituents are appropriately mixed in one stage, it may also be sometimes recommended to omit one or even two constituents at first and to admix them only at a later time.

Thus, the moulding compositions according to the present invention may be produced on the above-mentioned mixing aggregates, by melting on and homogenizing the two constituents A and B together, or by working the graft product B into the melt of the thermoplastic polyester A.

The temperature during the production of the mixtures is generally at least 10° C. and appropriately as high as 90° C. above the melting point of the polyester.

The moulding compositions according to the present invention are distinguished by their improved strength. An excellent characteristic is the improvement in their impact strength at low temperature.

In accordance with their property spectrum, the moulding compositions according to the present invention are particularly suitable in the injection moulding and extruding sector, wherever mouldings are subjected to high impact stresses, such as in the automobile industry for bumpers, spoilers, protective strips, parts of the bodywork, steering wheels and steering columns.

The following Examples illustrate the present invention in more detail.

EXAMPLES (A) Components which are used

I Polybutylene terephthalate having an intrinsic viscosity of 1.18 dl/g, measured in phenol/o-dichlorobenzene (weight ratio 1:1) at 25° C. in an Ubbelohde-viscosimeter.

II Polyethylene terephthalate having an intrinsic viscosity of 0.82 dl/g, measured as in I.

III Polycarbonate based on bisphenol A, phenol and phosgene, having a relative viscosity of 1.285, measured in dichloromethane at 25° C. in 0.5 % by weight solution in an Ubbelohde viscosimeter.

IV Grafted polybutadiene rubber
IV.1 Production of polydiene latices
IV 1.1 The following emulsion is polymerised in a reactor with stirring at 65° C. until a virtually complete monomer conversion takes place over a period of about 22 hours:
100.00 parts by weight of butadiene,
1.8 parts by weight of the sodium salt of disproportionated abietic acid,
0.257 parts by weight of sodium hydroxide,
0.3 parts by weight of n-dodecylmercaptan,
1.029 parts by weight of Na-ethylene diamine tetraacetate,
0.023 parts by weight of potassium persulphate and
176.0 parts by weight of water.

A latex is obtained which contains butadiene polymer particles having an average diameter ($d_{50}$) of 0.1 μm in a concentration of about 35 to 36% by weight. The polybutadiene particles have a gel content of from 90 to 95%, by weight (measured in toluene at 23° C).

IV 1.2 According to the directions in IV 1.1 the following emulsion is polymerised at from 60 to 68° C. over a period of about 110 hours:
100.0 parts by weight of butadiene,
70.0 parts by weight of water,
1.146 parts by weight of the sodium salt of disproportionated abietic acid,
0.055 parts by weight of ethylenediamine-tetraacetic sodium,
0.137 parts by weight of sodium hydroxide,
0.028 parts by weight of sodium hydrogen carbonate and
0.282 parts by weight of potassium persulphate.

A latex is obtained which contains polybutadiene particles having an average diameter ($d_{50}$) of 0.4 μm in a concentration of about 58%, by weight. The polybutadiene particles have a gel content of from 90 to 91% by weight (measured in toluene at 23° C.).

IV 1.3 Polybutadiene latex obtained by emulsion polymerisation in the presence of the sodium salt of disproportionated abietic acid as the emulsifier and potassium persulphate as the initiator, the polymerisation being carried out by known methods such that a finely divided latex having a wide particle size distribution is obtained. The $d_{50}$ value of the latex particles is 0.11 μm. The polybutadiene particles have a gel content of 93%, by weight (measured as under IV 1.1).

IV 1.4 Polybutadiene latex prepared with the addition of the auxiliaries described in IV 1.3. A coarsely divided latex with a wide particle size distribution is formed. The $d_{50}$ value of the latex particles is 0.39 μm. The polybutadiene particles have a gel content of 90%, by weight (measured as under IV 1.1).

IV 1.5 Distribution characteristics of the rubber latices IV 1.1 to IV 1.4:

| Latex | $d_{50}$ | $d_{90}$ | $d_{10}$ | $\frac{d_{90} - d_{10}}{d_{50}}$ |
|---|---|---|---|---|
| IV 1.1 | 0,10 | 0,22 | 0,07 | 1,5 |
| IV 1.2 | 0,40 | 0,59 | 0,15 | 1,1 |
| IV 1.3 | 0,11 | 0,30 | 0,06 | 2,18 |
| IV 1.4 | 0,38 | 0,86 | 0,06 | 2,10 | d-values: given in [μm].

IV.2 Production of graft products a Parts by weight of polydiene latex and b parts by weight of water are introduced into a reactor with stirring at 65° C. After initiation with c parts by weight of potassium persulphate, 100 parts by weight of styrene-acrylonitrile mixture (in a mixing ratio of 72/28) and separately a mixture consisting of d parts by weight of water, e parts by weight of the sodium salt of the disproportionated abietic acid and f parts by weight of 1N aqueous sodium hydroxide are metered thereto over a period of several hours. The mixture is subsequently completely polymerised to produce a final conversion of >98%, by weight, at a temperature of from 65° to 75° C. The quantities for this graft polymerisation are compiled in the following Table.

TABLE 1

| | Production of the graft products | | | | | | |
|---|---|---|---|---|---|---|---|
| Type | Latex IV 1.1 | Latex IV 1.2 | b | c | d | e | f |
| A | — | 690 | 100 | 0.50 | 100 | 4.0 | 3.0 |

TABLE 1-continued

| | Production of the graft products | | | | | | |
|---|---|---|---|---|---|---|---|
| Type | Latex IV 1.1 | Latex IV 1.2 | b | c | d | e | f |
| B | 228 | 551 | 100 | 0.52 | 100 | 4.2 | 3.1 |
| C | — | 517 | 150 | 0.58 | 100 | 4.8 | 3.5 |
| D | 171 | 414 | 100 | 0.52 | 100 | 4.8 | 3.5 |
| E | — | 402 | 233 | 0.67 | 100 | 5 | 3.666 |
| F | 666 | — | 134 | 0.666 | 100 | 6.25 | 4.37 |
| G | 133 | 322 | 190 | 0.66 | 100 | 5.1 | 3.8 |
| H | 200 | 281 | 170 | 0.66 | 100 | 5.3 | 3.9 |
| I | 266 | 241 | 135 | 0.66 | 100 | 5.4 | 3.9 |
| J | 333 | 201 | 100 | 0.66 | 100 | 5.5 | 4.0 |
| K | 400 | 161 | 80 | 0.66 | 100 | 5.6 | 4.1 |
| L | 533 | 81 | 20 | 0.66 | 100 | 6.0 | 4.5 |
| M | 333 | 201 | 80 | 0.50 | 100 | 4.0 | 3.5 |

For the above graft products and for the rubber bases thereof, the following relations exist according to IV 1.5 (as far as rubber mixtures are concerned):

$$\frac{d_{50}(b)}{d_{50}(a)} = 4;\ d_{10}(b) - d_{90}(a) = -0.07$$

| | Comparative graft products | | | | | | | |
|---|---|---|---|---|---|---|---|---|
| | Latex | | | | | | | |
| Type | IV 1.3 | IV 1.4 | IV 1.1 | IV 1.2 | b | c | d | e | f |
| V1 | 333 | 201 | — | — | 100 | 0,66 | 100 | 5,5 | 4,0 |
| V2 | 333 | | | 201 | 100 | 0,66 | 100 | 5,5 | 4,0 |

For the graft products to and for the rubber bases thereof the following relations exist according to IV 1.5:

| Type | $\frac{d_{50}(b)}{d_{50}(a)}$ | $D_{10}(b) - d_{90}(a)$ |
|---|---|---|
| V1 | 3,45 | −0,24 |
| V2 | 3,63 | −0,15 |
| V3 | 3,8 | −0,16 |

TABLE 2

| | Composition of the graft products | | | | |
|---|---|---|---|---|---|
| | Polybutadiene graft base | | Graft monomers | | Ungrafted SAN-resin parts by weight in 100 parts by weight of the graft product |
| Type | IV 1.1 % by weight[2] | IV 1.2 % by weight[2] | Styrene % by weight[2] | Acrylonitrile % by weight[2] | |
| A | ./. | 80 | 14.4 | 5.6 | 9 |
| B | 16 | 64 | 14.4 | 5.6 | 8 |
| C | ./. | 75 | 18 | 7 | 11 |
| D | 15 | 60 | 18 | 7 | 10 |
| E | ./. | 70 | 21.6 | 8.4 | 15 |
| F | 70 | ./. | 21.6 | 8.4 | 13 |
| G | 14 | 56 | 21.6 | 8.4 | <15 |
| H | 21 | 49 | 21.6 | 8.4 | <15 |
| I | 28 | 42 | 21.6 | 8.4 | <15 |
| J | 35 | 35 | 21.6 | 8.4 | <15 |
| K | 42 | 28 | 21.6 | 8.4 | <15 |
| L | 56 | 14 | 21.6 | 8.4 | <15 |
| M | 37.5 | 37.5 | 18 | 7 | ./.[3] |

[1] $[\eta]_{DMF}$ = 0.18–0.28 dl/g measured at 25° C.
[2] Total composition of the graft product without taking into account the ungrafted SAN-resin which is present
[3] The graft product M does not contain free SAN-resin (free SAN-resin in the graft product is removed by extraction with methylene chloride)

The comparative graft products V1, V2, V3 have a composition such as that of type J (see Table 2).

V Grafted polyacrylate rubber
V1 Finely-divided acrylate rubber
The following are introduced into a reactor:
1030 parts by weight of water and
5 parts by weight of sodium salt of $C_{14}$–$C_{16}$-alkyl sulphonic acid.
80 parts by weight of the solution 1 (see below) are fed in at 70° C. The reaction is subsequently initiated by the addition of 5 parts by weight of potassium peroxydisulphate in 100 parts by weight of water. The following solutions are subsequently metered:
Solution 1:
995 parts by weight of n-butylacrylate and
5 parts by weight of triallylcyanurate
  (80 parts of this solution were already introduced into the starting solution, the remainder of the solution is metered after initiation).
Solution 2:
20 parts by weight of the sodium salt of $C_{14}$–$C_{18}$-alkyl sulphonic acids and
700 parts by weight of water.
After the solutions (1) and (2) have been metered in over a period of 5 hours at 70° C., the solution is subsequently polymerised over a period of 4 hours at 70° C. A latex is produced which has a solids content of 35%, by weight. The latex particle size is 0.09 μm (Latex V1).
V2 Coarsely-divided acrylate rubber
The following solutions are used:
Starting solution 1:
  12.4 parts by weight of latex IV 1.1 and
  313 parts by weight of water,
Starting solution 2:
  0.82 parts by weight of potassium peroxydisulphate and
  20.0 parts by weight of water,
Influx 1:
  629.0 parts by weight of n-butylacrylate and
  1.0 part by weight of triallylcyanurate,
Influx 2:
  700.0 parts by weight of water and
  5.9 parts by weight of the sodium salts of $C_4$–$C_{16}$-alkyl sulphonic acids.
The starting solution 1 is heated to 65° to 68° C. and then 24 parts by weight of influx 1 are fed in. After initiation with starting solution 2, the remainder of influx 1 and influx 2 are metered over a period of 5 hours. The solution is subsequently stirred for 4 hours.
The latex has a solids content of 37% by weight. The latex particle size is 0.5 μm (latex V2). The polymer has a gel content of 93 parts by weight, and swelling index[1] of 8, measured in DMF at 23° C.
[1] Definition of the swelling index: Refer to M. Hoffmann, H Krömer, R. Kuhn, Polymeranalytik I and II, Georg Thieme Verlag Stuttgart 1977.

V3 The production of the graft products consisting of acrylate rubber and styrene/acrylonitrile mixture
General directive:
Polymerisation is carried out in a reactor using the following solutions or latices.
Starting solution 1: Latex V. 1 or A parts by weight Latex V. 2
Starting solution 2:
  Potassium peroxydisulphate: 2 parts by weight
  Water: 120 parts by weight
Influx 1:
  Styrene: 219 parts by weight
  Acrylonitrile: 85 parts by weight
Influx 2:
  Sodium salt of $C_{14}$–$C_{16}$-alkyl sulphonic acids: 6 parts by weight
  Water: 396 parts by weight.
The starting solution 2 is fed into the starting solution 1 at 65° C., and then influx 1 and influx 2 are metered in over a period of 4 hours at 65° C. The solution is subsequently left to complete polymerisation over a period of 4 hours at 65° C. (Latex V.3).
The graft polymer latices are subsequently treated as follows:
Starting solution 3:
  Water: 5525 parts by weight
  $MgSO_4 \cdot H_2O$ (Epsom salt): 107 parts by weight
Influx 3: Latex V.3 B parts by weight
Influx 4:
  Styrene: 112 parts by weight
  Acrylonitrile: 44 parts by weight
Activator:
  Potassium peroxydisulphate: 1.3 parts by weight
  Water: 78.0 parts by weight
With intensive stirring, the starting solution 3 is heated to 70° to 73° C. Over a period of 1 hour influx 3 is metered in. Then the influx 4 is added over a period of 30 minutes and the solution is subsequently activated by means of the activator solution. The solution is heated to 80° C., stirred for 2 hours, heated to 90° C. and stirred for a further 2 hours. After subsequent stabilization with 2 parts by weight of phenolic antioxidants, the solution is worked up by filtration, washing and drying to form a powder.

TABLE 3

| | Production of graft products | | |
|---|---|---|---|
| Type | A parts by weight Latex V.2 | A parts by weight Latex V.1 | B parts by weight Latex V.3 |
| N | 3.286,4 | ./. | 3.795 |
| O | ./. | 3.474,3 | 4.011 |
| P | 1.643 | 1.737 | 3.900 |

TABLE 4

| | Composition of the Graft products | | | |
|---|---|---|---|---|
| | Polyacrylate-graft base | | Graft sheath | |
| | Consisting of | Consisting of | | |
| Type | Latex V.1/V.3 parts by weight[1] | Latex V.2/V.3 parts by weight[1] | Styrene parts by weight | Acrylonitrile parts by weight |
| N | ./. | 70 | 21.6 | 8.4 |
| O | 70 | ./. | 21.6 | 8.4 |
| P | 35 | 35 | 21.6 | 8.4 |

[1]Based on the solids content

The grafted products N, O and P contain about 12% by weight of ungrafted SAN resin having an intrinsic viscosity (Staudinger-Index $[\eta]=0.3$ dl/g measured in DMF at 25° C.
VI Vinylmonomer copolymer
Copolymer consisting of 72 parts by weight of styrene and 28 parts by weight of acrylonitrile having an intrinsic viscosity $[\eta]=0.2$ dl/g (measured in DMF in an Ubbelohde-viscosimeter at 25° C).
(B) Production and testing of the moulding compositions

EXAMPLES 1–26

The constituents are melted and homogenized on a two-shaft extruder which is continuously operating. The cylinder temperature is selected in such a way that the composition temperatures which are shown in Tables 5-7 are observed. The strand of melt is degassed before issuing from the nozzle, is cooled in water, granulated and dried.

Standard small rods are produced from the moulding compositions using a conventional injection moulding machine. The notched impact strength is tested (according to DIN 53 453) at the given temperatures.

EXAMPLES 27-29

Similarly to tests 1-26, the graft product is mixed with melted polybutylene terephthalate on an extruder. Cut glass fibres 6 mm in length are subsequently metered in and homogeneously distributed in the mixed melt. After degassing the melt in front of the nozzle removing the strand of melt in water, granulating it and drying it, standard small rods are produced as described above. The impact strength and notched impact strength of the rods are tested at various temperatures (according to DIN 53 453). For results see Table 8.

The temperature of the composition in the extruder is 260° C., the temperature in the injection moulding machine is 250° C., and the moulding temperature is 80° C. The weights which are given relate to the moulding compositions.

TABLE 6

| | Component | | | | | Temperature of Moulding composition | | | Notched impact strength (kJ/m$^2$) | | |
|---|---|---|---|---|---|---|---|---|---|---|---|
| Example | I (PBT) | II (PET) | III (PC) | IV Graft product | | Extruder °C. | Injection moulding °C. | temperature °C. | +20° C. | −20° C. | −40° C. |
| | % by weight | | | Type | % by weight | | | | | | |
| 18 | 15.6 | 62.4 | | J | 22 | 270 | 260 | 140 | n. brok[1] | n. brok | 13 |
| 19 | 39 | 39 | | J | 22 | 270 | 260 | 80 | " | " | 14 |
| 20 | 54.6 | 23.4 | | J | 22 | 265 | 260 | 80 | " | " | 16 |
| 21 | | 78 | | J | 22 | 270 | 265 | 140 | " | " | 12 |
| 22 | 66 | | 18 | J | 16 | 275 | 260 | 80 | " | " | 13 |
| 23 | 55 | | 29 | J | 16 | 275 | 260 | 80 | " | " | 14 |

The % by weight relate to the moulding compositions.
[1]n. brok = not broken

TABLE 5

| Example | Component I (PBT) % by weight | IV Graft product % by weight | VI Vinylmonomer-Copolymer % by weight | Notched impact strength (kJ/m$^2$) | | | |
|---|---|---|---|---|---|---|---|
| | | | | +20° C. | −20° C. | −30° C. | −40° C. |
| 1[1] | 79 | A 21 | | n. brok[2] | 15 | | 9 |
| 2 | 79 | B 21 | | n. brok | n. brok | | 10 |
| 3[1] | 77.5 | C 22.5 | | n. brok | 20 | | 10 |
| 4 | 77.5 | D 22.5 | | " | n. brok | | 11 |
| 5[1] | 77 | E 23 | | " | 21 | 13 | 10 |
| 6[1] | 77 | F 23 | | " | 15 | 12 | 9 |
| 7 | 77 | G 23 | | " | n. brok | 20 | 12 |
| 8 | 77 | H 23 | | " | " | n. brok | 14 |
| 9 | 77 | I 23 | | " | " | " | 16 |
| 10 | 77 | J 23 | | " | " | " | 17 |
| 11 | 77 | K 23 | | " | " | " | 15 |
| 12 | 77 | L 23 | | " | " | 17 | 11 |
| 13 | 85 | J 15 | | " | | | 10 |
| 14 | 90 | 10 | | 14 | | | 7 |
| 15 | 77 | E 11.5 F 11.5 | | n. brok | n. brok | | 16 |
| 16 | 77 | M 23 | | n. brok | n. brok | | 20 |
| 17 | 72 | M 23 | 5 | n. brok | n. brok | | 16 |

[1]Comparative experiments
[2]not broken

Comparative Experiments

| PBT % by weight | Graft products type | (% by weight) | notched impact strength (kJ/m$^2$) | | | |
|---|---|---|---|---|---|---|
| | | | +20° C. | −20° C. | −30° C. | −40° C. |
| 77 | VI | 23 | n. broken | 22 | 12 | 9 |
| 77 | V2 | 23 | n. broken | 19 | 13 | 10 |
| 77 | V3 | 23 | n. broken | 20 | 13 | 9 |

TABLE 7

| | Components | | | Notched impact strength (kJ/m$^2$) | |
|---|---|---|---|---|---|
| Example | I (PBT) % by weight | V Graft product Type | % by weight | +20° C. | −20° C. |
| 24[1] | 77 | N | 23 | n. brok.[2] | 6 |
| 25[1] | 77 | O | 23 | 16 | 4 |
| 26 | 77 | P | 23 | n. brok. | 10 |

The temperature of the composition in the extruder is 260° C., in the injection moulding machine 250° C. and the moulding temperature is 80° C.
The percent by weight relate to the moulding compositions.
[1]Comparative attempts
[2]n. brok. = not broken

TABLE 8

| Example | I (PBT) % by weight | IV Graft product Type | IV Graft product % by weight | Glass fibres % by weight | Impact strength kJ/m² 20° C. | Impact strength kJ/m² −20° C. | Notched impact strength kJ/m² 20° C. | Notched impact strength kJ/m² −20° C. |
| --- | --- | --- | --- | --- | --- | --- | --- | --- |
| 27[1] | 55 | E | 15 | 30 | 51 | 53 | n. brok.[2] | 12 |
| 28 | 55 | J | 15 | 30 | 57 | 60 | n. brok. | 15 |
| 29 | 50 | J | 25 | 25 | n. brok | 62 | n. brok. | |

The temperature of the composition in the extruder is 26° C., is 250° C. in the injection moulding machine and the moulding temperature is 80° C.
The percent by weight relate to the reinforced moulding compositions.
[1]Comparative Example
[2]n. brok. = not broken

We claim:

1. Thermoplastic moulding compositions comprising
(A) from 65 to 97% by weight (based on A+B) of thermoplastic polyester and
(B) from 3 to 35% by weight (based on A+B) of the graft product
of at least one vinyl monomer selected from styrene, acrylonitrile and methyl methacrylate on particle-shaped, at least partially cross-linked diene rubbers and/or alkyl acrylate rubbers having an average rubber particle diameter of from 0.05 to 1 μm, the graft products having a rubber content of from 60 to 85%, by weight, characterised in that the graft products B are produced on the basis of a mixture of
   a. from 20 to 80% by weight (based on a+b) of a rubber latex having a particle diameter $d_{50}$ of from 0.05 to 0.19 μm, and
   b. from 80 to 20% by weight (based on a+b) of a rubber latex having a particle diameter $d_{50}$ of from 0.2 to 1.0 μm
with the limitation that
   (1) $d_{50}(b)$ is larger than $d_{50}(a)$ by a factor of from 1.5 to 8,
   (2) the quotient $Q=(d_{90}-d_{10})/d_{50}$ of the particular rubbers is at most 2, and
   (3) the difference $d_{10}(b)-d_{90}(a)$ is from 0.01 to −0.10.

2. Thermoplastic moulding compositions according to claim 1, characterised in that the graft product B is produced by mixing a rubber latex corresponding to (a) and a rubber latex corresponding to (b) and subsequently graft polymerising the vinyl monomers.

3. Thermoplastic moulding compositions according to claim 1, characterised in that the graft product B is produced by graft polymerising the vinyl monomers on a rubber latex corresponding to (a) and separately graft polymerising the vinyl monomers on a rubber latex corresponding to (b) and subsequently mixing the graft products which are obtained in this way.

4. Thermoplastic moulding compositions according to claim 1, characterised in that the diene rubbers or the alkyl acrylate rubbers have a gel content of $\geq 80\%$ by weight.

5. Thermoplastic moulding compositions according to claim 1, characterised in that the alkyl acrylate-rubbers are cross-linked with triallylcyanurate and/or triallylisocyanurate.

6. Thermoplastic moulding compositions according to claim 1, characterised in that the alkyl acrylate-rubbers contain a polybutadiene core.

7. Thermoplastic moulding compositions according to claim 1, characterised in that they contain free copolymer resin of graft monomers in a quantity of $\leq 15\%$ by weight and have a Staudinger index $[\eta]\leq 0.6$ dl/g, measured in DMF at 25° C.

8. Thermoplastic moulding compositions according to claim 1, characterised in that up to 80% by weight of the thermoplastic polyesters A are aromatic polycarbonates.

9. Thermoplastic moulding compositions according to claim 1, characterised in that they contain $\leq 60\%$ by weight of glass fibres.

* * * * *

UNITED STATES PATENT AND TRADEMARK OFFICE
CERTIFICATE OF CORRECTION

PATENT NO. : 4,535,124
DATED : August 13, 1985
INVENTOR(S) : Binsack et al

It is certified that error appears in the above—identified patent and that said Letters Patent are hereby corrected as shown below:

Column 7, line 67 change "2,4,2-methylpentanediol-2,4," to read --2,4 and 2-methylpentanediol-2,4,--.

Signed and Sealed this

Twenty-eighth Day of January 1986

[SEAL]

Attest:

DONALD J. QUIGG

*Attesting Officer*   *Commissioner of Patents and Trademarks*